United States Patent
Xu et al.

(10) Patent No.: US 10,667,144 B2
(45) Date of Patent: May 26, 2020

(54) TECHNIQUES AND APPARATUSES FOR MEASURING BEAM REFERENCE SIGNALS BASED AT LEAST IN PART ON LOCATION INFORMATION

(71) Applicant: QUALCOMM Incorporated, San Diego, CA (US)

(72) Inventors: Huan Xu, San Diego, CA (US); Shan Qing, San Diego, CA (US); Kumarabhijeet Singh, San Diego, CA (US); Chetan Chakravarthy, San Diego, CA (US); Arvindhan Kumar, San Diego, CA (US); Parthasarathy Krishnamoorthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/880,269

(22) Filed: Jan. 25, 2018

(65) Prior Publication Data

US 2019/0230519 A1 Jul. 25, 2019

(51) Int. Cl.
*H04W 16/28* (2009.01)
*H04B 7/08* (2006.01)
*H04W 64/00* (2009.01)

(52) U.S. Cl.
CPC ............ *H04W 16/28* (2013.01); *H04B 7/088* (2013.01); *H04W 64/00* (2013.01)

(58) Field of Classification Search
CPC .............................. H04W 16/28; H04W 64/00
See application file for complete search history.

(56) References Cited

U.S. PATENT DOCUMENTS

| 2014/0120926 | A1* | 5/2014 | Shin | H04W 56/00 455/450 |
| 2015/0351135 | A1* | 12/2015 | Schmidt | H04W 76/10 455/450 |
| 2016/0047884 | A1* | 2/2016 | Zhang | G01S 5/0284 342/458 |
| 2017/0026887 | A1 | 1/2017 | Sirotkin et al. | |

(Continued)

FOREIGN PATENT DOCUMENTS

WO  WO-2017136732 A1     8/2017
WO  WO-2017184190 A1  *  10/2017  .......... H04W 64/003

OTHER PUBLICATIONS

PCT/US2019/014805, Michael J. Dehaemer, Qualcomm Incorporated, May 2019, 15 pgs.*

(Continued)

*Primary Examiner* — Joseph E Dean, Jr.
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may determine location information regarding the UE; and activate a receive beam of the UE in at least one symbol, associated with at least one transmit beam of at least one base station, based at least in part on the location information, wherein the UE is configured to activate the receive beam based at least in part on mapping information, at least partially determined by the UE, that indicates that the receive beam is associated with the location information. Numerous other aspects are provided.

30 Claims, 9 Drawing Sheets

(56) References Cited

U.S. PATENT DOCUMENTS

2017/0118689 A1   4/2017   Zhang et al.
2017/0208494 A1   7/2017   Moon et al.
2017/0223552 A1*  8/2017   Roy .................... H04W 16/28
2017/0289867 A1  10/2017   Fan et al.

OTHER PUBLICATIONS

Micheal J. Dehaemer, Qualcomm Incorporated Oct. 5, 2019, 15 pgs (Year: 2019).*
"International Search Report and Written Opinion for International Application No. PCT/US2019/014805—ISA/EPO, dated May 10, 2019, 15 pages" (Year: 2019).*

* cited by examiner

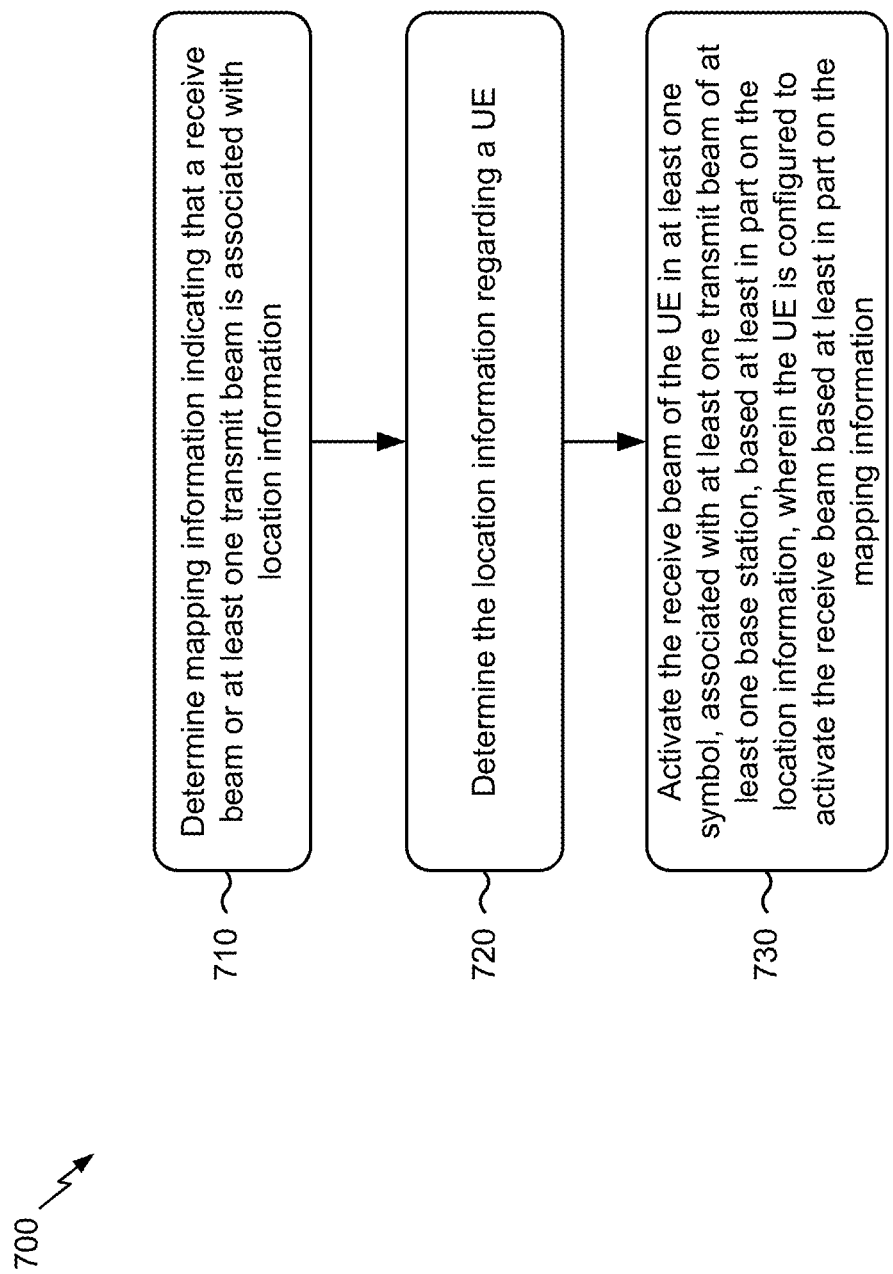

TECHNIQUES AND APPARATUSES FOR MEASURING BEAM REFERENCE SIGNALS BASED AT LEAST IN PART ON LOCATION INFORMATION

FIELD OF THE DISCLOSURE

Aspects of the present disclosure generally relate to wireless communication, and more particularly to techniques and apparatuses for measuring a beam reference signal (BRS) based at least in part on location information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include determining location information regarding the UE; and activating a receive beam of the UE in at least one symbol, associated with at least one transmit beam of at least one base station, based at least in part on the location information, wherein the UE is configured to activate the receive beam based at least in part on mapping information, at least partially determined by the UE, that indicates that the receive beam is associated with the location information.

In some aspects, a UE for wireless communication may include memory and one or more processors operatively coupled to the memory. The memory and the one or more processors may be configured to determine location information regarding the UE; and activate a receive beam of the UE in at least one symbol, associated with at least one transmit beam of at least one base station, based at least in part on the location information, wherein the UE is configured to activate the receive beam based at least in part on mapping information, at least partially determined by the UE, that indicates that the receive beam is associated with the location information.

In some aspects, a non-transitory computer-readable medium may store one or more instructions for wireless communication. The one or more instructions, when executed by one or more processors of a UE, may cause the one or more processors to determine location information regarding the UE; and activate a receive beam of the UE in at least one symbol, associated with at least one transmit beam of at least one base station, based at least in part on the location information, wherein the UE is configured to activate the receive beam based at least in part on mapping information, at least partially determined by the UE, that indicates that the receive beam is associated with the location information.

In some aspects, an apparatus for wireless communication may include means for determining location information regarding the apparatus; and activating a receive beam of the apparatus in at least one symbol, associated with at least one transmit beam of at least one base station, based at least in part on the location information, wherein the apparatus is configured to activate the receive beam based at least in part on mapping information, at least partially determined by the apparatus, that indicates that the receive beam is associated with the location information.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
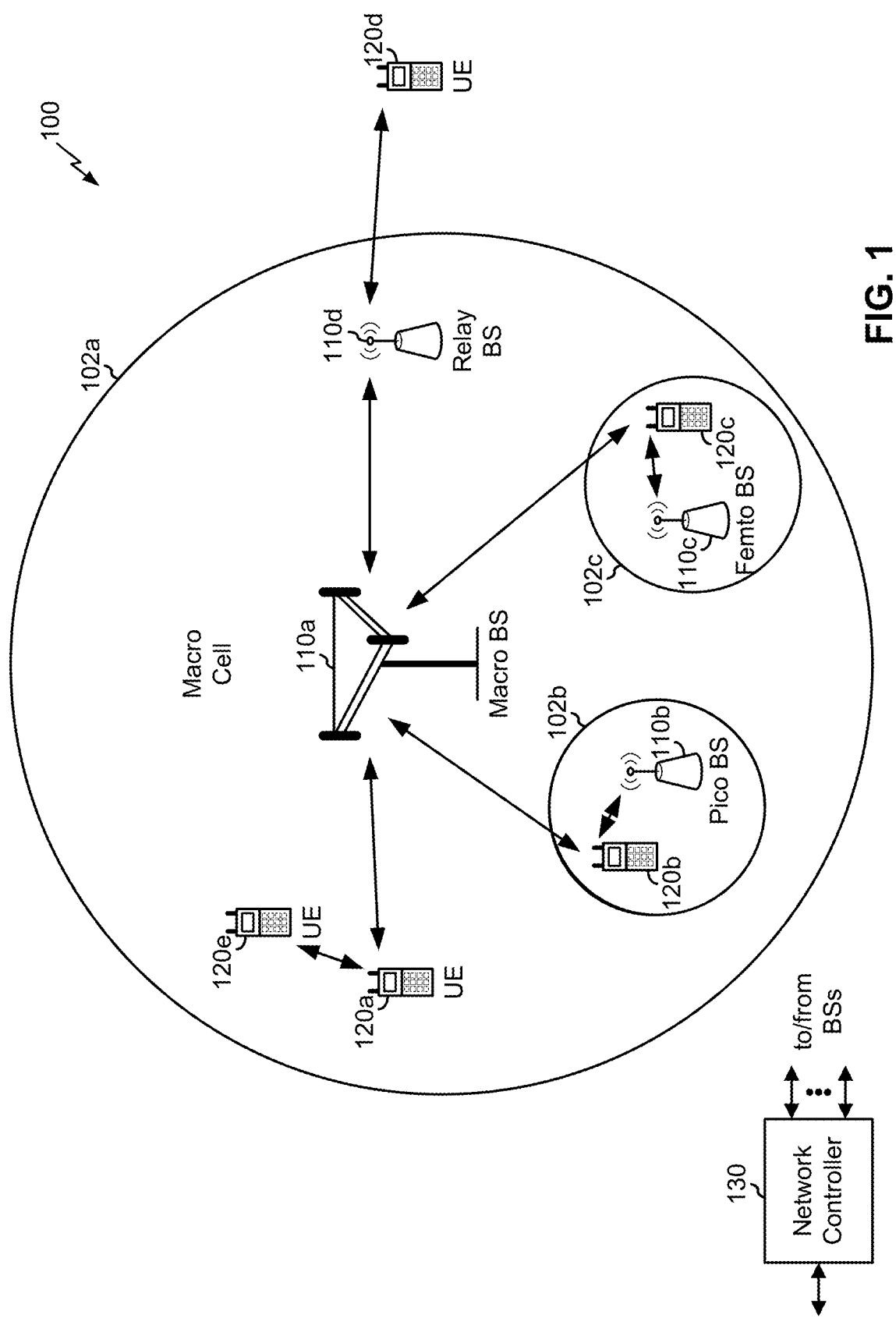
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
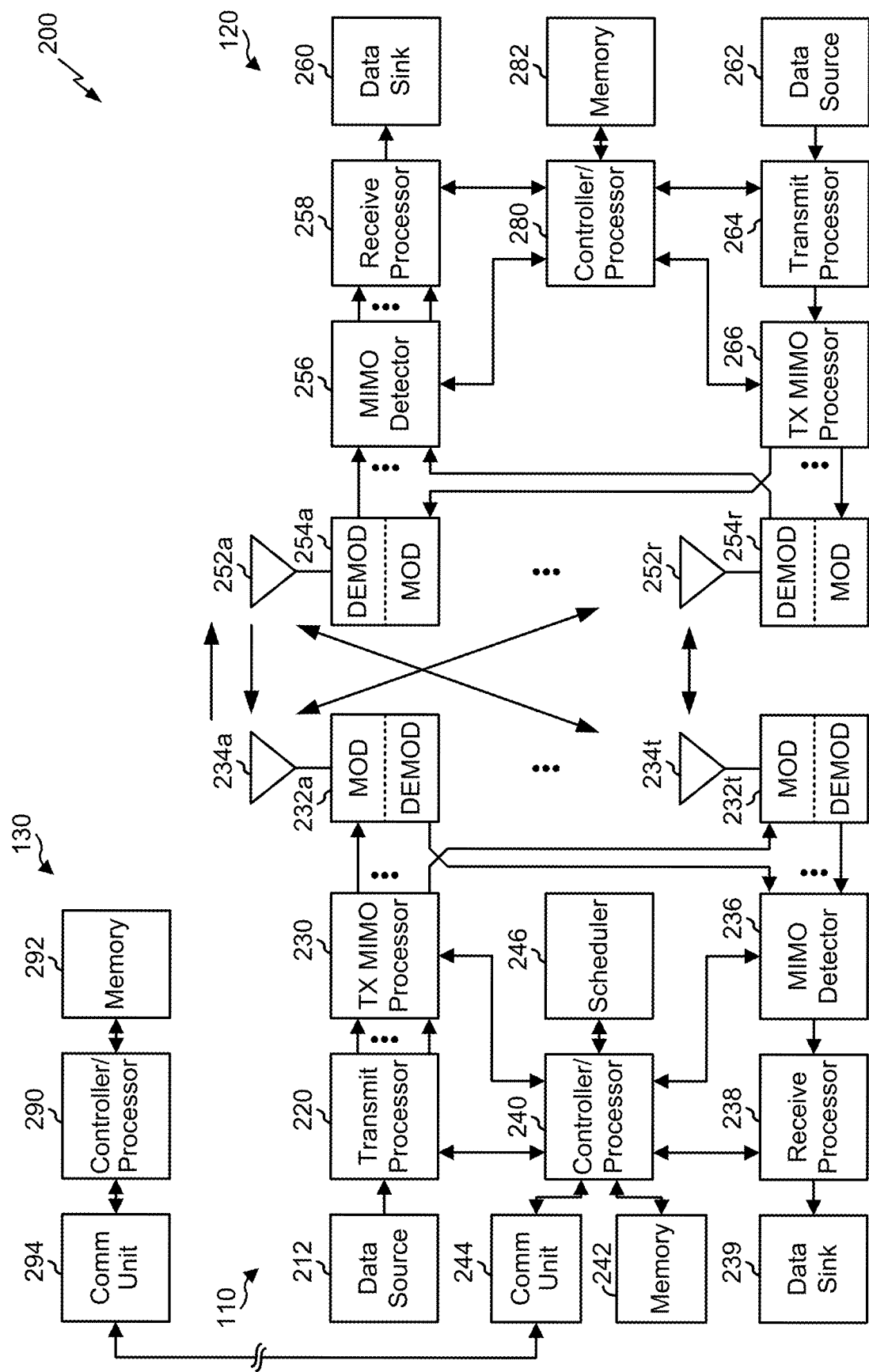
FIG. 2 is a block diagram conceptually illustrating an example of a base station in communication with a user equipment (UE) in a wireless communication network, in accordance with various aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general $T \geq 1$ and $R \geq 1$.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with identifying a BRS for which to perform a measurement based at least in part on location information, as described in more detail elsewhere herein. For example, controller/processor 240 of BS 110, controller/processor 280 of UE 120, and/or any other component(s) of FIG. 2 may perform or direct operations of, for example, process 700 of FIG. 7 and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for determining location information regarding the UE; means for activating a receive beam of the UE in at least one symbol, associated with at least one transmit beam of at least one base station, based at least in part on the location information; means for deactivating the receive beam of the UE in one or more symbols other than the at least one symbol; means for activating a plurality of receive beams of the UE based at least in part on the location information; means for determining or updating the mapping information; means for performing cell reselection for a cell associated with the base station; means for identifying a moving direction of the UE; means for identifying the at least one transmit beam based at least in part on the moving direction of the UE; means for identifying a plurality of candidate transmit beams based at least in part on the location information; means for identifying a plurality of candidate transmit beams based at least in part on the location information; means for scheduling a measurement opportunity for one or more of the plurality of candidate transmit beams; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
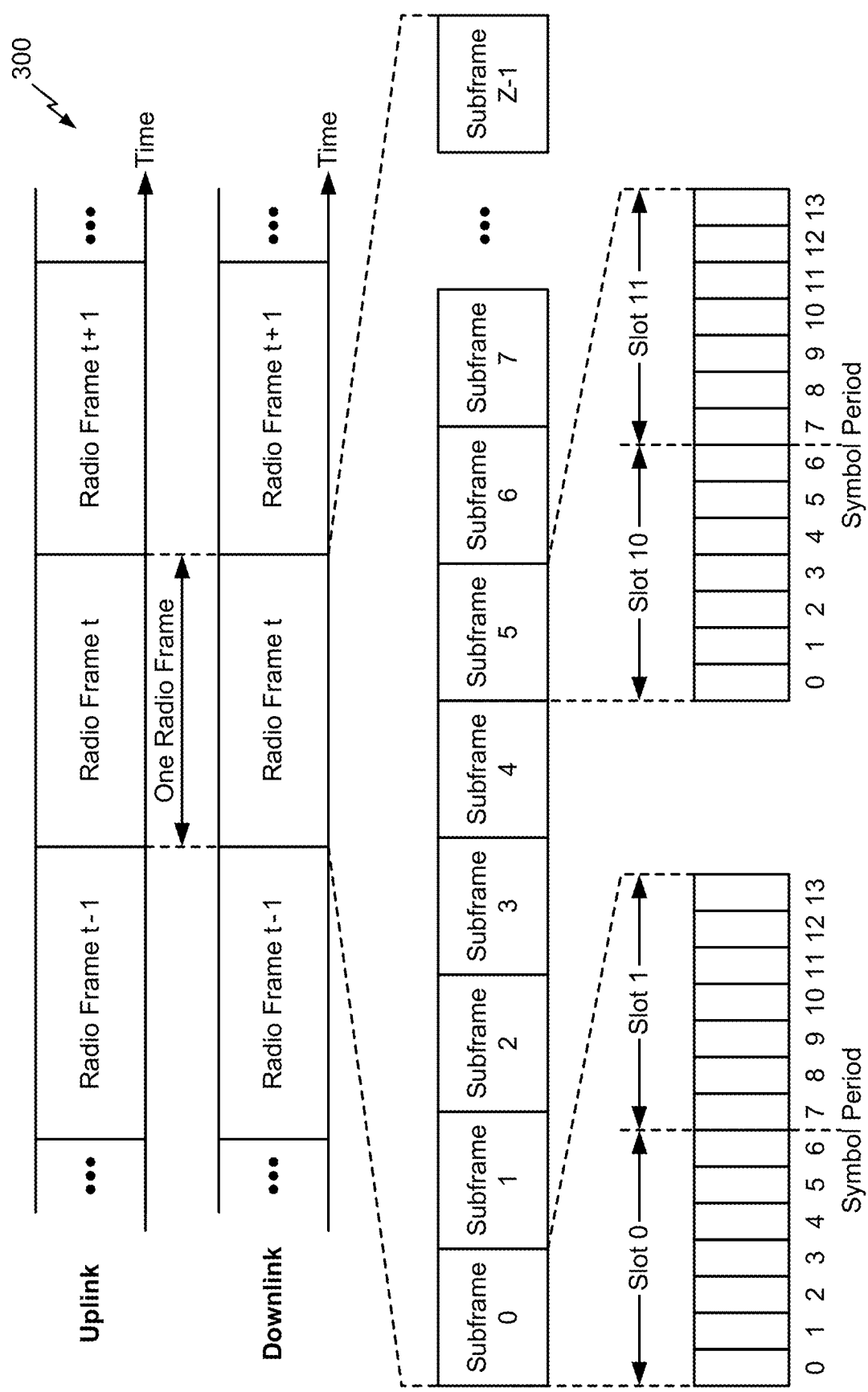
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z ($Z \geq 1$) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
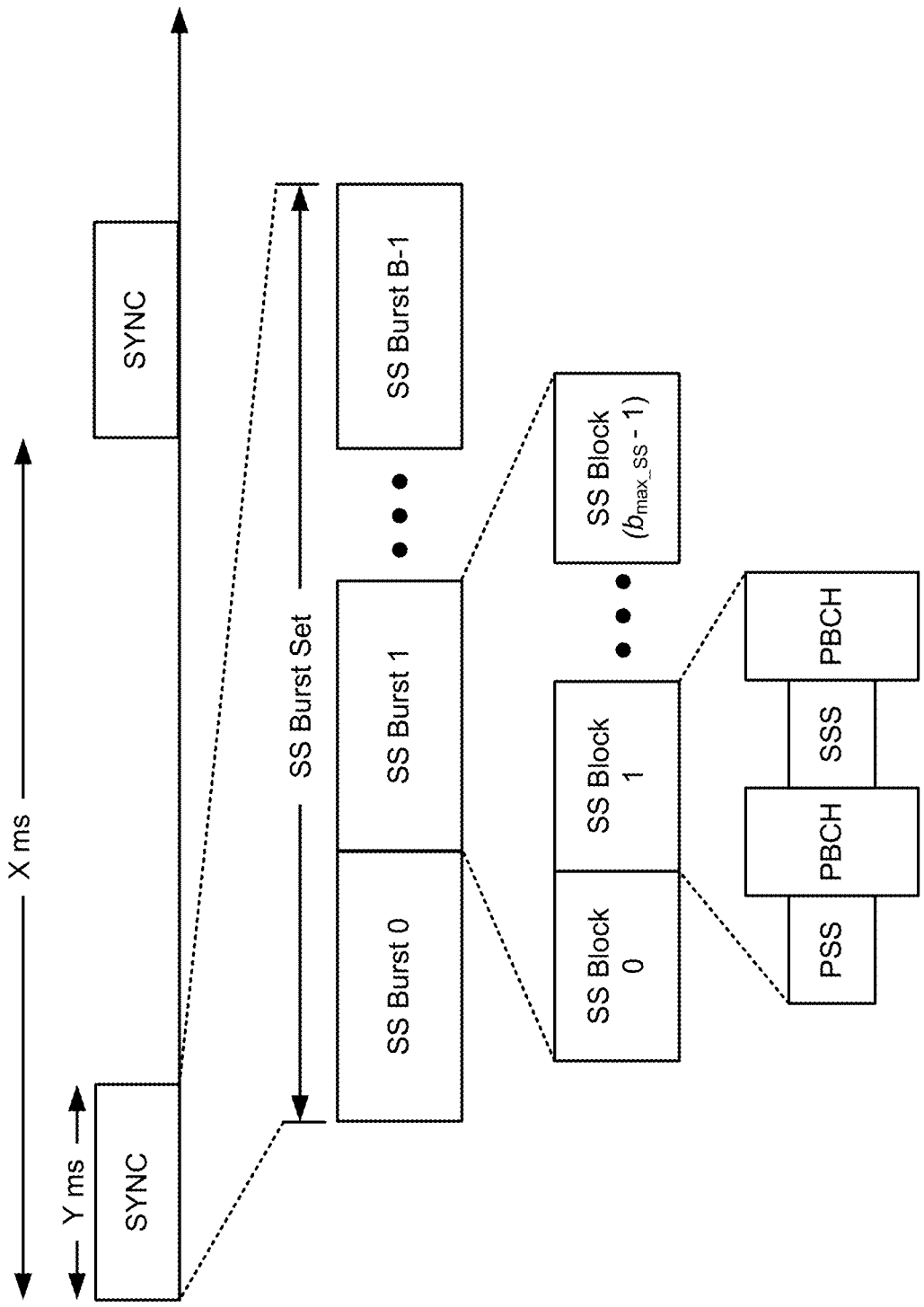
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
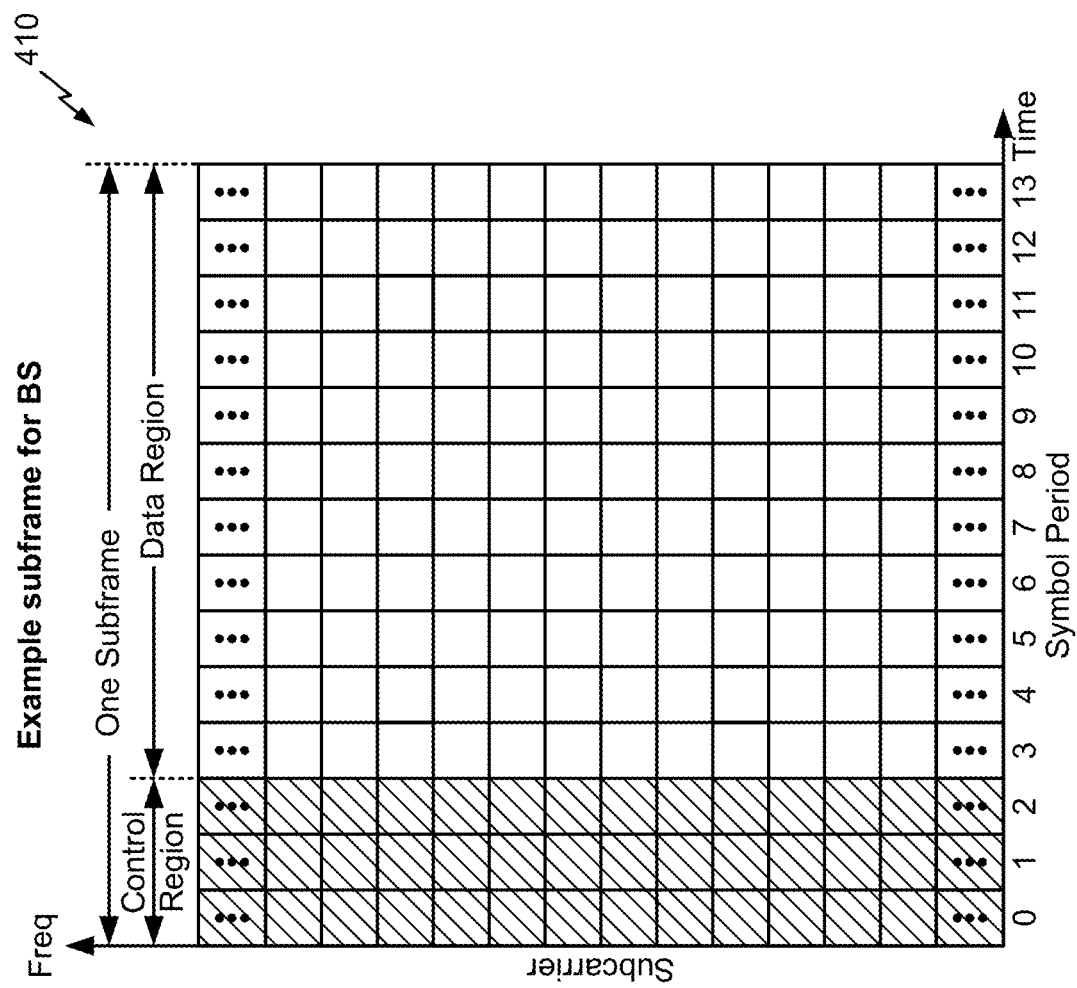
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

In 5G/NR, beamforming may be used to improve radio frequency (RF) performance. For example, for downlink communications, a UE antenna array associated with UE 120 may generate a beam (termed herein a receive beam or RX beam). The receive beam may be paired with a beam generated by a BS antenna array of BS 110, which may be termed a transmit beam, TX beam, or network beam. A similar beam pairing may be used for uplink or sidelink communications. The receive beam and the transmit beam may be aligned according to beam reference signals (BRS). For example, UE 120 and/or BS 110 may transmit BRSs on various resources (e.g., in succession, such as in a sweeping configuration). Once a BRS with a satisfactory signal quality or signal strength is detected, the detecting entity may configure a corresponding beam (transmit beam or receive beam) based at least in part on the BRS. Thus, beam pairing is performed.

However, the number of potential beams (receive beams and/or transmit beams) for BS 110 and UE 120 may be large. Therefore, UE 120 may need to monitor many resources to identify acceptable BRSs of BS 110, as described in more detail in connection with FIG. 5, below. This may use significant battery power and RX resources of UE 120.

Some techniques and apparatuses described herein identify a BRS for which UE 120 is to monitor based at least in part on location information associated with UE 120. For example, since BRSs tend to be associated with particular locations or areas, the UE 120 may identify a BRS that is associated with a current or predicted location of UE 120 based at least in part on mapping information that identifies BRSs and corresponding locations. In some aspects, UE 120 may not monitor resources associated with other BRSs, which conserves battery power and RX resources of UE 120. In some aspects, UE 120 may, at least in part, determine the mapping information (e.g., dynamically, iteratively, etc.) based at least in part on measurements performed by UE 120. In this way, battery resources and RX resources of UE 120 are conserved. Furthermore, beam selection, handover, and/or the like may be faster when the appropriate BRS is identified based at least in part on mapping information, since UE 120 may need to perform fewer BRS measurements to identify an appropriate BRS.

Figure 5:
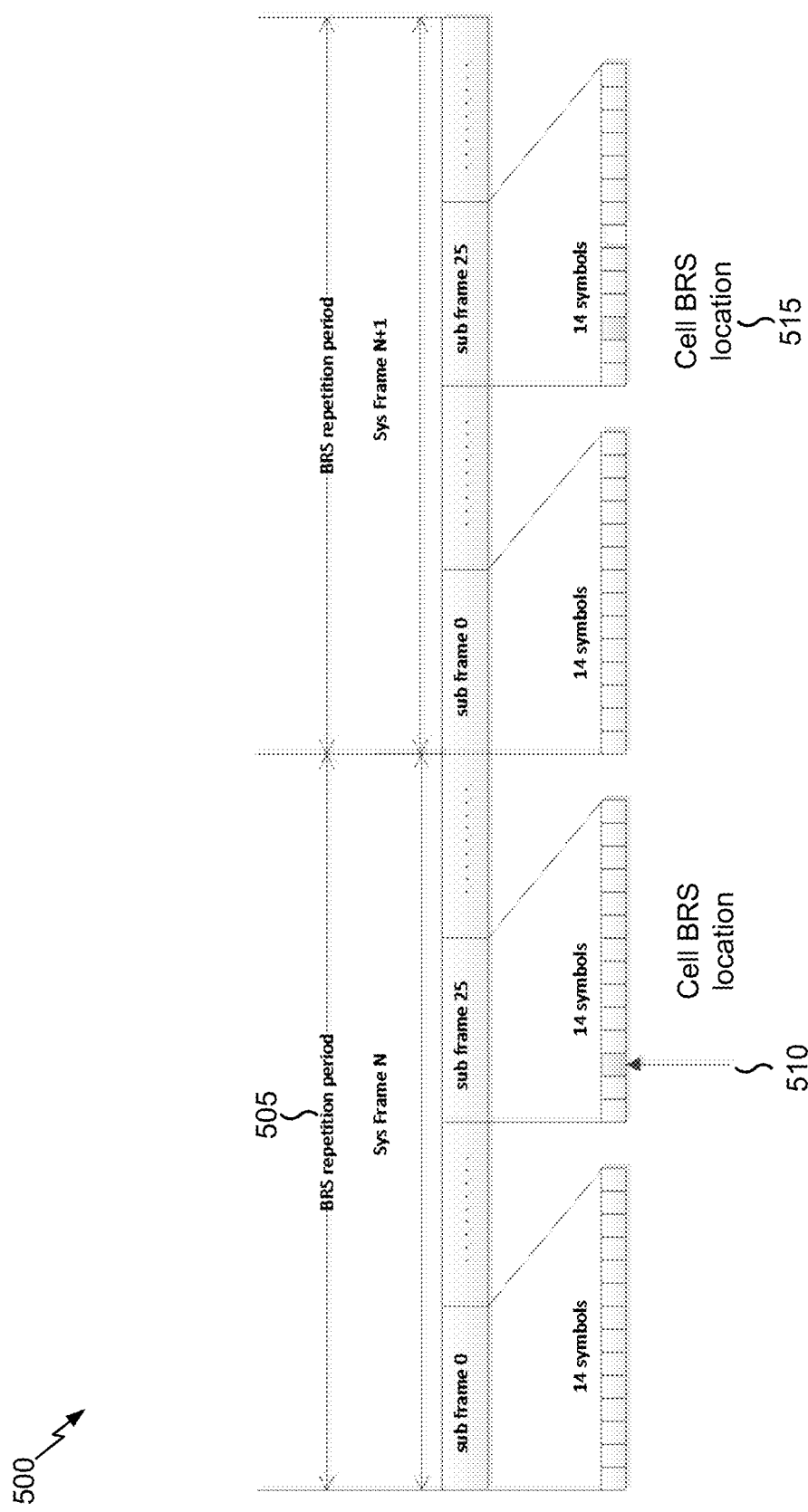
FIG. 5 illustrates an example of a frame structure for BRS in a wireless communication network, in accordance with various aspects of the present disclosure.

FIG. 5 illustrates an example 500 of a frame structure for BRS in a wireless communication network, in accordance with various aspects of the present disclosure. In FIG. 5, BS 110 may transmit BRSs for UE 120. For example, as shown by reference number 505, BS 110 may transmit BRSs in a BRS repetition period. In some aspects, the BRS repetition period may have a same length as a system frame of UE 120. In some aspects, the BRS repetition period may have a length of, for example, 20 ms, although any length of BRS repetition period is possible and contemplated. As shown, each system frame may include a plurality of subframes. Here, each frame includes 50 subframes of 14 symbols each. However, other subframe configurations and/or symbol configurations are possible and contemplated.

As shown by reference number 510, BS 110 may transmit a BRS for a particular cell (e.g., a particular beam) in a particular resource. Here, BS 110 transmit the BRS in a third symbol of subframe 25 of the BRS repetition period. Other symbols and/or subframes of the BRS repetition period may be used for other BRSs. For example, the other BRSs may be transmitted using different beams and/or cells of BS 110, or may be associated with beams or cells of other BSs 110. As shown by reference number 515, the BRS may be repeated. For example, the BRS may be repeated at a regular interval, such as once per frame. As shown, the BRS may be repeated in a same subframe and symbol, which UE 120 may use to identify the cell associated with the BRS.

UE 120 may monitor the resources for the BRSs to determine a BRS that is satisfactory for a beam pairing with BS 110. For example, UE 120 may activate an RX antenna array or an RX receive chain to monitor the resources. However, monitoring all 14 symbols of each subframe may use significant power and RX resources of UE 120. For example, the RX antenna array or RX receive chain may need to be tuned to the BRS resources (e.g., instead of other resources). Thus, performing monitoring of all BRS resources (or a large subset of BRS resources) may negatively impact battery performance and RX performance of UE 120.

As indicated above, FIG. 5 is provided as an example. Other examples are possible and may differ from what was described with respect to FIG. 5.

Figure 6A:
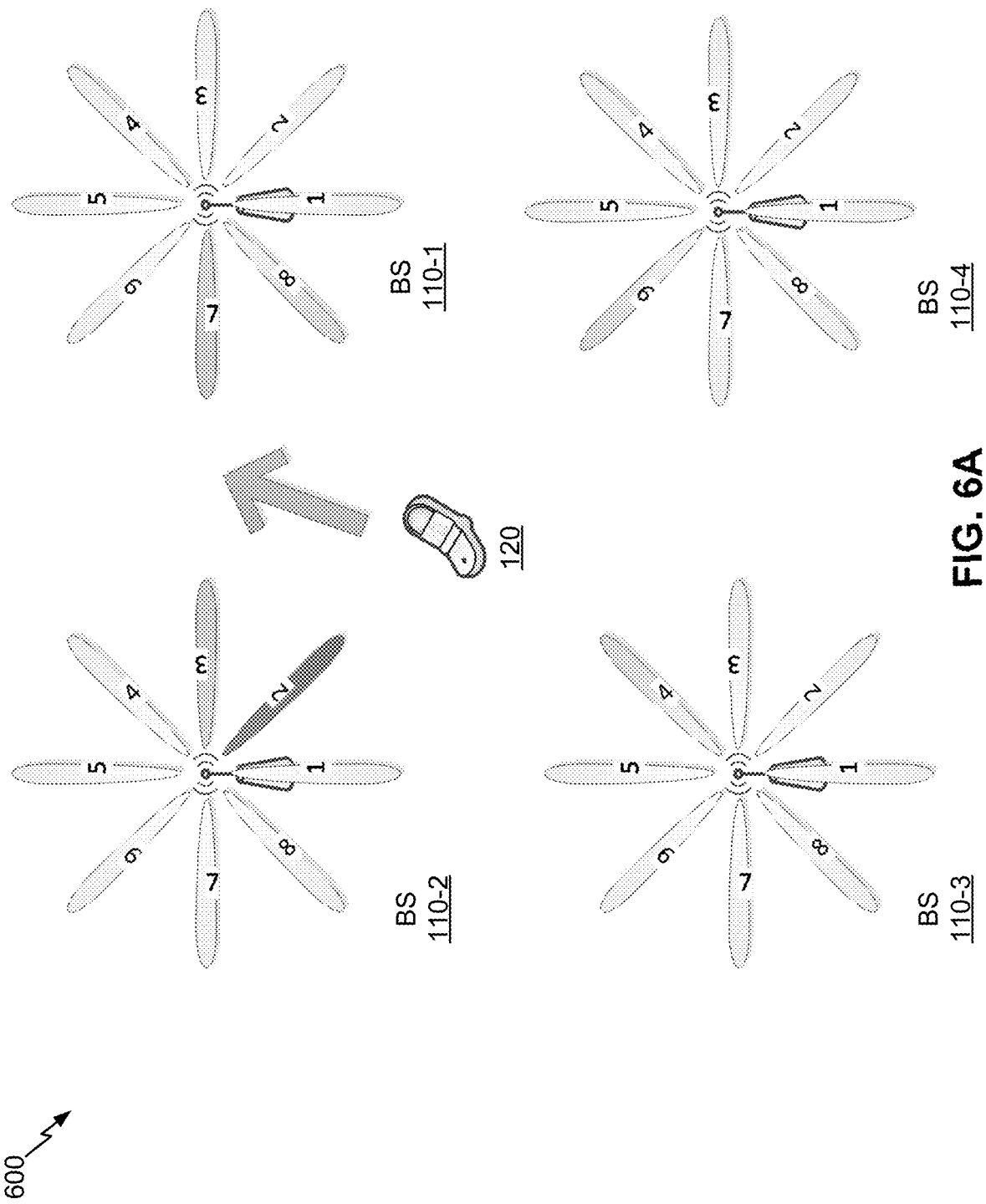
FIGS. 6A and 6B illustrate an example of identifying BRSs for which to perform a measurement based on location information, in accordance with various aspects of the present disclosure.
Figure 6B:
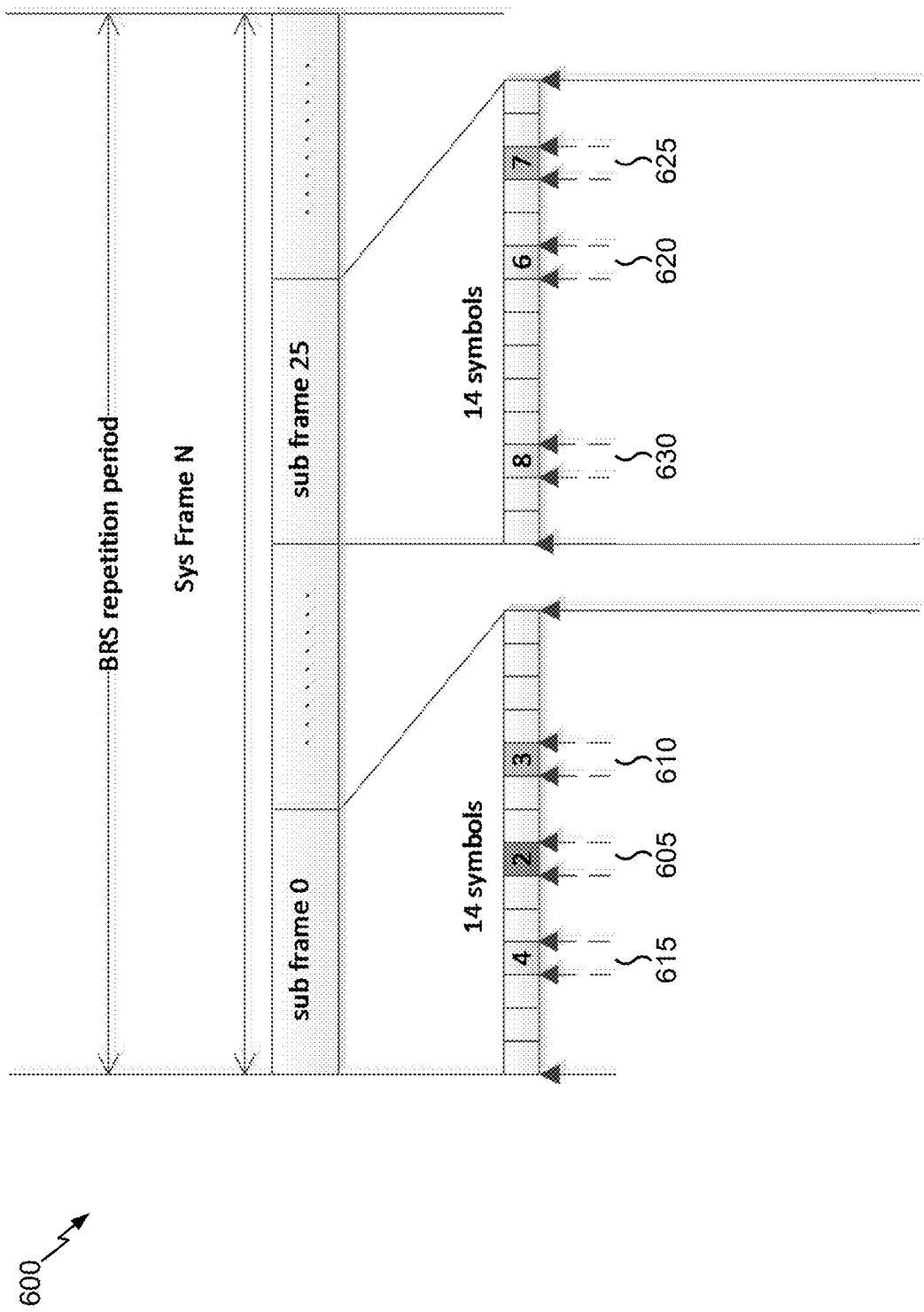

FIGS. 6A and 6B illustrate an example 600 of identifying BRSs for which to perform a measurement based on location information, in accordance with various aspects of the present disclosure. FIG. 6A shows BSs 110-1 through 110-4. Each BS 110 transmits 8 BRSs corresponding to 8 beams. The 8 BRSs/beams are identified by respective index numbers 1 through 8. Beams that cover UE 120 or are predicted to cover UE 120 are shown as shaded. For example, beams 7 and 8 of BS 110-1, beams 2 and 3 of BS 110-2, beam 4 of BS 110-3, and beam 6 of BS 110-4 cover UE 120 or are predicted to cover UE 120. Here, beam 7 of BS 110-1 and beam 3 of BS 110-2 are predicted to cover UE 120 based at least in part on a moving direction of UE 120, shown by the arrow above UE 120.

UE 120 may determine or identify beams and/or BRSs that cover UE 120 or are predicted to cover UE 120 based at least in part on mapping information. For example, the mapping information may identify a location and a BRS (e.g., a BRS index, a subframe, a symbol, a cell identifier, a BS identifier, etc.) that has previously been detected at that location. In some aspects, UE 120 may determine the mapping information. For example, as UE 120 detects BRSs, UE 120 may store information identifying the BRSs and the locations at which the BRSs are detected. In some aspects, UE 120 may provide the mapping information (e.g., to another UE 120, to BS 110, etc.), which may conserve resources of a recipient of the mapping information that would otherwise be used to determine the mapping information.

In some aspects, UE 120 may update the mapping information. For example, UE 120 may add new BRSs and corresponding locations to the mapping information. In some aspects, UE 120 may remove a BRS and/or location from the mapping information. For example, UE 120 may determine that a particular BRS is not detected at a location identified by the mapping information, and may accordingly remove the particular BRS from the mapping information. As another example, UE 120 may remove a particular BRS or set of BRSs based at least in part on the mapping information being of a particular age (e.g., based at least in part on the mapping information being more than one day old, more than one week old, etc.). As yet another example, UE 120 may update the mapping information based at least in part on detecting a change associated with a particular BS 110. For example, if UE 120 determine that one BRS of the particular BS 110 is not received at a corresponding location, UE 120 may update (e.g., remove) other BRSs of the particular BS 110 from the mapping information.

In some aspects, UE 120 may determine the mapping information based at least in part on information associated with BS 110. For example, a base station (e.g., gNB) may be created or implemented by a particular vendor. As another example, the base station may be a particular type of base station. UE 120 may determine mapping information based at least in part on the vendor or type. For example, UE 120 may determine a location associated with a first BRS of BS 110. UE 120 may receive or determine information indicating a vendor or type of BS 110. UE 120 may determine one or more locations of one or more second BRSs of BS 110 based at least in part on the vendor or type. For example, if BS 110 is associated with one or more beams at particular offsets (e.g., time offsets, frequency offsets, angular offsets, and/or the like) from a beam of the first BRS, UE 120 may determine mapping information identifying locations of the one or more beams based at least in part on the particular offsets. In this way, UE 120 may determine mapping information based at least in part on a vendor or type of BS 110, which reduces time and RX resources needed to determine the mapping information.

In some aspects, UE 120 may determine the mapping information based at least in part on location information of UE 120. For example, when UE 120 detects a BRS at a location, UE 120 may store mapping information identifying the BRS and the location. In some aspects, the location information may be determined according to or based at least in part on a measurement history of UE 120, gyroscope information of UE 120, global positioning system (GPS) information of UE 120, information regarding another network (e.g., a location of a WiFi network detected by UE 120), or any other information that identifies or indicates a location or orientation of UE 120.

In some aspects, UE 120 may identify a BRS based at least in part on a moving direction, speed, velocity, and/or direction of travel of UE 120. For example, the location information may include the moving direction, speed, velocity, and/or direction of travel. UE 120 may determine one or more BRSs associated with a location to which UE 120 is predicted to move based at least in part on the moving direction, speed, velocity, and/or direction of travel. In some aspects, UE 120 may perform measurements for the one or more BRSs once UE 120 arrives at the location. In this way, UE 120 may reduce time associated with a handover or cell reselection by preemptively identifying beams that may cover a future location of UE 120.

As shown in FIG. 6B, UE 120 may perform measurements for the beams and/or BRSs identified using the mapping information and the location information. For example, as shown by reference number 605, UE 120 may perform a measurement for a BRS of beam 2 of BS 110-2 (e.g., since beam 2 of BS 110-2 is determined to cover a current location of UE 120). Similarly, UE 120 may perform measurements for BRSs of beam 3 of BS 110-2 (reference number 610), beam 4 of BS 110-3 (reference number 615), beam 6 of BS 110-4 (reference number 620), beam 7 of BS 110-1 (reference number 625), and beam 8 of BS 110-1 (reference number 630).

In some aspects, UE 120 may not perform measurements for other beams or BRSs (e.g., other than those identified by reference numbers 605-630). For example, UE 120 may deactivate an RX antenna array and/or a RX receive chain, or may enter an idle mode, for the other beams or BRSs. Thus, UE 120 may save power and receive resources. For example, since UE 120 performs measurement for 3 of 14 symbols of each subframe, power savings of the UE 120 may be significant (e.g., approximately 72 percent in comparison to performing measurement for all 14 subframes).

Beam 3 of BS 110-2 and beam 7 of BS 110-1 cover a predicted location of UE 120 based at least in part on a moving direction of UE 120. UE 120 may perform target cell selection based at least in part on BRSs of these beams. This may improve stability of measurements for these beams.

Thus, UE 120 may improve speed of finalizing candidate beams, thereby shortening reselection or handover delay.

As described herein, measuring a BRS may include activating a receive beam associated with the BRS to receive the BRS. For example, the mapping information may indicate a respective receive beam associated with each BRS. UE 120 may activate the respective receive beam to receive each BRS that is identified based at least in part on the mapping information and the location information. For example, UE 120 may activate a plurality of receive beams associated with the BRSs identified by reference numbers 605-630 to receive the BRSs identified by reference numbers 605-630. This may conserve RX resources and power of UE 120 in comparison to activating receive beams associated with all symbols of the subframes shown in FIG. 6B.

In some aspects described herein, UE 120 is described as activating a receive beam to receive a BRS. This may be synonymous with activating a receive beam to receive or pair with a transmit beam (e.g., a transmit beam that carries the BRS). For example, the mapping information may indicate that any one or more of the receive beam, the BRS, and/or the transmit beam are associated with a particular location. In other words, the techniques and apparatuses described herein include identifying a receive beam based at least in part on the mapping information, activating a receive beam based at least in part on the mapping information, identifying a transmit beam based at least in part on the mapping information, and identifying a BRS based at least in part on the mapping information. Furthermore, the techniques and apparatuses described herein are equally applicable for transmit beams and for cells corresponding to the transmit beams.

As indicated above, FIGS. 6A and 6B are provided as examples. Other examples are possible and may differ from what was described with respect to FIGS. 6A and 6B.

FIG. 7 is a diagram illustrating an example process 700 performed, for example, by a UE, in accordance with various aspects of the present disclosure. Example process 700 is an example where a UE (e.g., UE 120) performs identification of a BRS to measure based at least in part on location information.

As shown in FIG. 7, in some aspects, process 700 may include determining mapping information indicating that a receive beam is associated with location information (block 710). For example, the UE may determine (e.g., using controller/processor 280 and/or the like) mapping information. The mapping information may identify receive beams, transmit beams (e.g., of base stations), and/or BRSs associated with or carried by the transmit beams. The mapping information may further identify location information that indicates locations associated with the receive beams, transmit beams, and/or BRSs.

As shown in FIG. 7, in some aspects, process 700 may include determining the location information regarding a UE (block 720). For example, the UE may determine (e.g., using controller/processor 280 and/or the like) location information regarding the UE. In some aspects, the UE may determine a location of the UE. For example, the location may be a current location of the UE. Additionally, or alternatively, the location may be a predicted location of the UE (e.g., based at least in part on a moving direction of the UE).

As shown in FIG. 7, in some aspects, process 700 may include activating the receive beam of the UE in at least one symbol, associated with at least one transmit beam of at least one base station, based at least in part on the location information, wherein the UE is configured to activate the receive beam based at least in part on the mapping information (block 730). For example, the UE may activate a receive beam (e.g., using antenna 252, DEMOD 254, MIMO detector 256, receive processor 258, controller/processor 280, and/or the like) in at least one symbol based at least in part on the location information and the mapping information. In some aspects, the UE may activate the receive beam to receive at least one BRS in the at least one symbol. For example, the at least one symbol may correspond to at least one transmit beam to carry the at least one BRS.

Process 700 may include additional aspects, such as any single aspect or any combination of aspects described below.

In some aspects, the location information include at least one of global positioning system (GPS) information, gyroscope information, information identifying a speed or velocity of the UE, or information identifying a geographic location of the UE. In some aspects, the UE may deactivate the receive beam of the UE in one or more symbols other than the at least one symbol. In some aspects, the UE may activate a plurality of receive beams of the UE based at least in part on the location information, wherein the plurality of receive beams are associated with a plurality of transmit beams of a plurality of base stations, wherein the plurality of transmit beams includes the at least one transmit beam and the plurality of base stations includes the at least one base station. In some aspects, the UE may determine or update the mapping information.

In some aspects, the mapping information relates to multiple, different transmit beams of a plurality of base stations, wherein the multiple, different transmit beams includes the at least one transmit beam and the plurality of base stations includes the at least one base station. In some aspects, the multiple, different transmit beams are determined based at least in part on a vendor or type of the plurality of base stations. In some aspects, the receive beam is activated based at least in part on a current location or a predicted location of the UE.

In some aspects, the receive beam is activated based at least in part on the at least one transmit beam covering the UE or covering a predicted location of the UE. In some aspects, the UE may perform cell reselection for a cell associated with the base station. In some aspects, the UE may identify a moving direction of the UE; and identify the at least one transmit beam based at least in part on the moving direction of the UE. In some aspects, the UE may a plurality of candidate transmit beams based at least in part on the location information, wherein the at least one transmit beam is one of the plurality of candidate transmit beams. In some aspects, the UE may identify a plurality of candidate transmit beams based at least in part on the location information; and schedule a measurement opportunity for one or more of the plurality of candidate transmit beams.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising: determining location information regarding the UE; and activating a receive beam of the UE in at least one symbol, associated with at least one transmit beam of at least one base station, based at least in part on the location information, wherein the UE is configured to activate the receive beam based at least in part on mapping information, at least partially determined by the UE, that indicates that the receive beam is associated with the location information, wherein the mapping information relates to multiple, different transmit beams of a plurality of base stations, wherein the multiple, different transmit beams include the at least one transmit beam, wherein the plurality of base stations include the at least one base station and wherein the receive beam is activated based at least in part on a predicted location of the UE.

2. The method of claim 1, wherein the location information include at least one of:
global positioning system (GPS) information,
gyroscope information,
information identifying a speed or velocity of the UE, or
information identifying a geographic location of the UE.

3. The method of claim 1, further comprising:
deactivating the receive beam of the UE in one or more symbols other than the at least one symbol.

4. The method of claim 1, further comprising:
activating a plurality of receive beams of the UE based at least in part on the location information, wherein the plurality of receive beams are associated with the multiple, different transmit beams.

5. The method of claim 1, further comprising:
determining or updating the mapping information.

6. The method of claim 1, wherein the multiple, different transmit beams are determined based at least in part on a vendor or type of the plurality of base stations.

7. The method of claim 1, wherein the receive beam is activated based at least in part on the at least one transmit beam covering the UE or covering the predicted location of the UE.

8. The method of claim 1, further comprising:
performing cell reselection for a cell associated with the base station.

9. The method of claim 1, further comprising:
identifying a moving direction of the UE; and
identifying the at least one transmit beam based at least in part on the moving direction of the UE.

10. The method of claim 1, further comprising:
identifying a plurality of candidate transmit beams based at least in part on the location information, wherein the plurality of candidate transmit beams include the multiple, different transmit beams.

11. The method of claim 1, further comprising:
identifying a plurality of candidate transmit beams based at least in part on the location information; and
scheduling a measurement opportunity for one or more of the plurality of candidate transmit beams.

12. A user equipment (UE) for wireless communication, comprising:
a memory; and
one or more processors operatively coupled to the memory, the one or more processors configured to: determine location information regarding the UE; and activate a receive beam of the UE in at least one symbol, associated with at least one transmit beam of at least one base station, based at least in part on the location information, wherein the UE is configured to activate the receive beam based at least in part on mapping information, at least partially determined by the UE, that indicates that the receive beam is associated with the location information, wherein the mapping information relates to multiple, different transmit beams of a plurality of base stations, wherein the multiple, different transmit beams include the at least one transmit beam, wherein the plurality of base stations include the at least one base station and wherein the receive beam is activated based at least in part on a predicted location of the UE.

13. The UE of claim 12, wherein the one or more processors are further to:
deactivate the receive beam of the UE in one or more symbols other than the at least one symbol.

14. The UE of claim 12, wherein the one or more processors are further to: activate a plurality of receive beams of the UE based at least in part on the location information, wherein the plurality of receive beams are associated the multiple, different transmit beams.

15. The UE of claim 12, wherein the one or more processors are further to:
determine or update the mapping information.

16. The UE of claim 12, wherein the multiple, different transmit beams are determined based at least in part on a vendor or type of the plurality of base stations.

17. The UE of claim 12, wherein the one or more processors are further to:
perform cell reselection for a cell associated with the base station.

18. The UE of claim 12, where the one or more processors are further to:
identify a moving direction of the UE; and
identify the at least one transmit beam based at least in part on the moving direction of the UE.

19. The UE of claim 12, wherein the multiple, different transmit beams are determined based at least in part on a vendor or type of the plurality of base stations.

20. A non-transitory computer-readable medium storing instructions for wireless communication, the instructions comprising:
one or more instructions that, when executed by one or more processors of a user equipment (UE), cause the one or more processors to: determine location information regarding the UE; and activate a receive beam of the UE in at least one symbol, associated with at least one transmit beam of at least one base station, based at least in part on the location information, wherein the UE is configured to activate the receive beam based at least in part on mapping information, at least partially determined by the UE, that indicates that the receive beam is associated with the location information, wherein the mapping information relates to multiple, different transmit beams of a plurality of base stations, wherein the multiple, different transmit beams include the at least one transmit beam, wherein the plurality of base stations include the at least one base station and wherein the receive beam is activated based at least in part on a predicted location of the UE.

21. The non-transitory computer-readable medium of claim 20, wherein the one or more instructions, when executed by the one or more processors, cause the one or more processors to:
deactivate the receive beam of the UE in one or more symbols other than the at least one symbol.

22. The non-transitory computer-readable medium of claim 20, wherein the one or more instructions, when executed by the one or more processors, cause the one or more processors to, wherein the one or more processors are further to: activate a plurality of receive beams of the UE based at least in part on the location information, wherein the plurality of receive beams are associated with the multiple, different transmit beams.

23. The non-transitory computer-readable medium of claim 20, wherein the one or more instructions, when executed by the one or more processors, cause the one or more processors to, wherein the one or more processors are further to:
determine or update the mapping information.

24. An apparatus for wireless communication, comprising:
- means for determining location information regarding the apparatus; and
- means for activating a receive beam of the apparatus in at least one symbol, associated with at least one transmit beam of at least one base station, based at least in part on the location information, wherein the apparatus is configured to activate the receive beam based at least in part on mapping information, at least partially determined by the apparatus, that indicates that the receive beam is associated with the location information, wherein the mapping information relates to multiple, different transmit beams of a plurality of base stations, wherein the multiple, different transmit beams include the at least one transmit beam, wherein the plurality of base stations include the at least one base station and wherein the receive beam is activated based at least in part on a predicted location of the apparatus.

25. The apparatus of claim 24, further comprising:
means for deactivating the receive beam of the apparatus in one or more symbols other than the at least one symbol.

26. The apparatus of claim 24, further comprising:
means for determining or updating the mapping information.

27. The apparatus of claim 24, wherein the receive beam is activated based at least in part on the at least one transmit beam covering the predicted location of the apparatus.

28. The apparatus of claim 24, wherein the predicted location of the apparatus is determined based at least in part on a moving direction of the apparatus.

29. The non-transitory computer-readable medium of claim 20, wherein the multiple, different transmit beams are determined based at least in part on a vendor or type of the plurality of base stations.

30. The apparatus of claim 24, wherein the multiple, different transmit beams are determined based at least in part on a vendor or type of the plurality of base stations.

* * * * *